UNITED STATES PATENT OFFICE.

JESSE L. JONES, OF EDGEWOOD PARK, PENNSYLVANIA, ASSIGNOR TO WESTINGHOUSE ELECTRIC & MANUFACTURING COMPANY, A CORPORATION OF PENNSYLVANIA.

METHOD OF REMOVING LEAD FROM COPPER-SCRAP.

1,349,382.    Specification of Letters Patent.    Patented Aug. 10, 1920.

No Drawing.    Application filed January 16, 1919. Serial No. 271,500.

*To all whom it may concern:*

Be it known that I, JESSE L. JONES, a citizen of the United States, and a resident of Edgewood Park, in the county of Allegheny and State of Pennsylvania, have invented a new and useful Improvement in Methods of Removing Lead from Copper-Scrap, of which the following is a specification.

My invention relates to the purification of copper-scrap and more particularly to the removal of lead and other impurities which may be oxidized and thus separated from the remaining copper.

Heretofore, copper scrap containing certain oxidizable impurities, and particularly lead, has been purified by what is known as the "flapping" method in which copper scrap, in molten condition, has been agitated by a hoe-like implement to constantly expose different portions to the air and so cause oxidization of the lead and other impurities contained in it. After this operation, which is a long and tedious one, has been performed, the oxidized impurities and the copper have been separated in any suitable manner. This method is slow and, consequently, expensive and is also unsatisfactory as it is difficult to determine when all of the impurities have been oxidized, with the result that the operation may, in some instances, be continued longer than necessary while, in other instances, the impurities will not be fully removed.

Another and somewhat more preferable method of removing such impurities from copper-scrap has been what is known as the air process in which air, under pressure, is forced through a body of molten copper scrap in such quantities and for such time as to insure oxidization of the lead and other impurities originally contained therein. This process, however, is slow and requires attention as there is danger of also oxidizing an excessive portion of the copper.

The primary object of my present invention resides in the provision of a method for moving oxidizable impurities, particularly lead, from copper scrap in a manner which will insure proper purification of the copper.

Another object of my invention is the provision of a process which will not require particular attention and which may be conducted rapidly and without danger of excessive oxidization of the copper and consequent delay and expense.

In practising my invention, I employ an oxidizing agent which may be added to the copper scrap, when the latter is in molten condition, and which will quickly and completely oxidize lead and other oxidizable impurities, the resulting oxids rising to the top of the molten copper so that they may be readily removed.

An oxidizing agent which I have found well suited for this purpose is what is commonly known as copper scale which probably comprises a mixture, in varying proportions, of cupric and cuprous oxids. The amount of copper scale which may best be employed will vary in proportion to the amount of oxidizable impurities contained in the copper scrap to be purified and may best be determined, in each instance, by small trial heats or tests. As an example, I have found, in one instance, that, by adding copper scale to the molten copper scrap in the proportions of substantially 800 pounds of copper-scale to 40,000 pounds of copper scrap, the lead and other oxidizable impurities have been completely and quickly removed.

The copper scale, when added to the molten copper scrap, is melted and immediately dissolves out the lead and other impurities, the oxygen of the copper scale combining with the lead and other impurities to form the several oxids, while the copper of the copper scale combines with the copper of the copper scrap being purified. These oxids of the various impurities rise to the surface of the molten copper as a scum and may be separated from the copper in any suitable manner. For example, I may throw a small quantity of sand upon the molten mass after the oxids have been formed, in which case the sand will combine with the lead and other oxids to form silicates which may be readily removed from the copper.

From the foregoing explanation, it will be clear that I have provided an extremely simple, cheap and rapid method of removing lead and other impurities from copper scrap. It will further be apparent that numerous minor changes in the several steps may be made and that the proportions of the materials employed may be altered, as may be found expedient in different circumstances. For these reasons, no limitations are to be imposed upon my invention other than those set forth in the claims.

I claim as my invention:

1. The method of removing certain impurities from copper scrap which comprises melting the copper scrap, adding copper scale thereto to oxidize the impurities and separating the purified copper and the oxidized impurities.

2. The method of removing certain impurities from copper scrap which comprises melting the copper scrap, adding an oxidizing agent which melts in the copper scrap and dissolves out the impurities as oxids and separating the purified copper and the oxids thus formed.

3. The method of removing lead and other oxidizable impurities from copper scrap which comprises adding copper scale to the copper scrap in molten condition and removing the resultant oxids.

4. The method of removing lead from copper scrap which comprises melting the copper scrap and adding a copper oxid thereto.

5. The method of removing lead from copper scrap which comprises melting the copper scrap and adding copper scale thereto in substantially the proportions of one part by weight of copper scale to 50 parts by weight of copper-scrap.

In testimony whereof I have hereunto subscribed my name this 28th day of Dec. 1918.

JESSE L. JONES.